(12) United States Patent
Benschop et al.

(10) Patent No.: US 8,463,921 B2
(45) Date of Patent: Jun. 11, 2013

(54) METHOD AND SYSTEM FOR CONTROLLING A COMPUTER APPLICATION PROGRAM

(75) Inventors: Dirk Leonard Benschop, Etten-Leur (NL); Henderik Reinout Benschop, Rozenburg (NL)

(73) Assignee: Scipioo Holding B.V., Etten-Leur (NL)

( * ) Notice: Subject to any disclaimer, the term of this patent is extended or adjusted under 35 U.S.C. 154(b) by 174 days.

(21) Appl. No.: 12/015,862

(22) Filed: Jan. 17, 2008

(65) Prior Publication Data

US 2009/0187666 A1    Jul. 23, 2009

(51) Int. Cl.
*G06F 15/16* (2006.01)

(52) U.S. Cl.
USPC ........... 709/229; 709/217; 709/218; 709/219; 709/225; 709/226; 709/232

(58) Field of Classification Search
USPC ................. 709/217, 218, 219, 225, 226, 229, 709/232
See application file for complete search history.

(56) References Cited

U.S. PATENT DOCUMENTS

| | | | |
|---|---|---|---|
| 5,475,819 A | 12/1995 | Miller | |
| 6,298,383 B1 * | 10/2001 | Gutman et al. | 709/229 |
| 6,453,327 B1 | 9/2002 | Nielsen | |
| 6,529,943 B1 * | 3/2003 | Ohi | 709/206 |
| 6,615,231 B1 * | 9/2003 | Deen et al. | 709/201 |
| 6,718,389 B2 * | 4/2004 | Navarre et al. | 709/227 |
| 7,260,617 B2 * | 8/2007 | Bazinet et al. | 709/219 |
| 7,453,998 B2 * | 11/2008 | Jacob et al. | 379/114.05 |
| 7,500,108 B2 * | 3/2009 | Johnson et al. | 713/187 |
| 7,523,164 B2 * | 4/2009 | Kantor et al. | 709/206 |
| 2002/0095488 A1 | 7/2002 | Primak | |
| 2002/0156728 A1 | 10/2002 | Jaschhof et al. | |
| 2002/0174194 A1 | 11/2002 | Mooney et al. | |

(Continued)

FOREIGN PATENT DOCUMENTS

| | | |
|---|---|---|
| EP | 0479660 A | 4/1992 |
| EP | 0813162 A | 12/1997 |

(Continued)

OTHER PUBLICATIONS

Official Search Report of the European Patent Office in counterpart foreign application No. PCT/NL2008/050030 filed Jan. 17, 2008.

(Continued)

*Primary Examiner* — Liangche A Wang
(74) *Attorney, Agent, or Firm* — De Vries & Metman

(57) ABSTRACT

Aspects of the invention relate to a computer-implemented method of controlling a computer application program in a computer system configured for electronically communication with a client. The computer system is configured to have access to a first request set of one or more allowable requests corresponding to a first application state of the computer application program. The computer application program may run on the computer system or on one or more other computer systems. A client request is received at the computer system for the computer application program. The computer application program is in the first application state in relation to said client (using e.g. the client connection). The client request is analysed to determine if the client request matches one of the allowable requests corresponding to the first application state of the computer application program. The computer application program is controlled by instructing this program to execute the client request only if the client request matches an allowable request of the first request set.

31 Claims, 4 Drawing Sheets

U.S. PATENT DOCUMENTS

| | | | |
|---|---|---|---|
| 2003/0018721 A1 | 1/2003 | Gupta | |
| 2003/0023873 A1 | 1/2003 | Ben-Itzhak | |
| 2003/0026396 A1 | 2/2003 | Weik | |
| 2003/0112948 A1 | 6/2003 | Brown et al. | |
| 2003/0154165 A1 | 8/2003 | Horn | |
| 2003/0172159 A1* | 9/2003 | Schuba et al. | 709/225 |
| 2003/0204719 A1 | 10/2003 | Ben-Itzhak | |
| 2003/0233318 A1 | 12/2003 | King et al. | |
| 2004/0176072 A1 | 9/2004 | Gellens | |
| 2004/0205135 A1 | 10/2004 | Hallam-Baker | |
| 2005/0021649 A1 | 1/2005 | Goodman | |
| 2005/0111648 A1 | 5/2005 | Roome | |
| 2005/0249214 A1 | 11/2005 | Peng | |
| 2005/0273857 A1 | 12/2005 | Freund | |
| 2006/0020692 A1 | 1/2006 | Jaffray | |
| 2006/0123421 A1* | 6/2006 | Loboz | 718/105 |
| 2006/0168024 A1 | 7/2006 | Mehr et al. | |
| 2006/0187901 A1* | 8/2006 | Cortes et al. | 370/352 |
| 2006/0239190 A1 | 10/2006 | Kumar et al. | |
| 2007/0078929 A1* | 4/2007 | Beverly | 709/204 |
| 2008/0147837 A1* | 6/2008 | Klein et al. | 709/223 |
| 2008/0192918 A1 | 8/2008 | Benschop | |
| 2008/0194234 A1 | 8/2008 | Benschop | |
| 2008/0195515 A1 | 8/2008 | Benschop | |
| 2008/0195713 A1 | 8/2008 | Benschop | |
| 2008/0196092 A1 | 8/2008 | Benschop | |
| 2008/0196093 A1 | 8/2008 | Benschop | |
| 2008/0196094 A1 | 8/2008 | Benschop | |
| 2008/0319857 A1* | 12/2008 | Dobbins et al. | 705/14 |
| 2009/0138476 A1* | 5/2009 | Zimler et al. | 707/9 |
| 2009/0158403 A1 | 6/2009 | Benschop | |
| 2009/0171821 A1* | 7/2009 | Denker et al. | 705/30 |
| 2009/0178117 A1 | 7/2009 | Benschop | |

FOREIGN PATENT DOCUMENTS

| | | |
|---|---|---|
| EP | 1180748 A | 2/2002 |
| EP | 1180756 A | 2/2002 |
| EP | 1282087 | 2/2003 |
| EP | 1457912 | 9/2004 |
| EP | 1496655 A | 1/2005 |
| JP | 2002082856 | 3/2002 |
| JP | 2004343580 | 12/2004 |
| JP | 2006331015 | 12/2006 |
| NL | 1022704 C2 | 8/2004 |
| WO | WO 00/42748 A | 7/2000 |
| WO | WO 01/72002 | 9/2001 |
| WO | WO 02/075547 | 9/2002 |
| WO | WO 03/003234 A | 1/2003 |
| WO | WO 03061213 A | 7/2003 |
| WO | WO 2004/036855 | 4/2004 |
| WO | WO 2004/071035 | 8/2004 |
| WO | WO 2004/088455 A | 10/2004 |
| WO | WO 2004/075086 A | 12/2005 |
| WO | WO 2005124621 | 12/2005 |
| WO | WO 2009/042173 | 4/2009 |

OTHER PUBLICATIONS

Sandhu R.S. et al: Access Control: Principles and Practice, IEEE Communicationas Magazine, vol. 32, No. 9, Sep. 1, 1994, pp. 40-48.
State Intellectual Property Office of The People's Republic of China, Notification of the First Office Action and Search Report, for Chinese Application No. 200880124649.7, dated Nov. 2, 2012.
Notice of Reasons for Rejections for Japanese Application Serial No. 2010-543070,drafted Mar. 26, 2012, mailing date of Notice Apr. 3, 2012, 3 pages.

\* cited by examiner

METHOD AND SYSTEM FOR CONTROLLING A COMPUTER APPLICATION PROGRAM

BACKGROUND

The discussion below is merely provided for general background information and is not intended to be used as an aid in determining the scope of the claimed matter.

With the proliferation of the Internet, host systems can provide their services to numerous client systems, where both host and client systems are distributed throughout the world. Once a proper connection is established, information can flow freely between a host system and a client system.

For example, in a conventional distributed network a plurality of host systems or servers are in communication with a plurality of client systems via a network or a collection of networks, e.g., the Internet. The architecture of such a distributed network is a source of strength (e.g., enabling free flow of information between numerous systems) and a source of vulnerability (e.g., creating vulnerabilities to malicious attacks).

Specifically, when a client system attempts to establish a connection, e.g., a TCP (Transmission Control Protocol) connection, to a host system, the client and host exchange a set sequence of messages or packets. This general approach applies to all TCP connections: Web, telnet, email and so on. When the connection is set up, the client system may send requests to the host system, e.g. for content.

In order to prevent or reduce malicious actions of client system on host systems, firewalls are commonly known. A firewall is a dedicated appliance or software which inspects network traffic passing through it, and denies or permits passage based on a set of rules.

There are several classifications of firewalls depending on where the communication is taking place, where the communication is intercepted and the state that is being traced. Network layer firewalls, also called packet filters, operate at a relatively low level of the TCP/IP protocol stack, not allowing packets to pass through the firewall unless they match the established rule set. These firewalls filter traffic based on packet attributes. The firewall administrator may define the rules; or default rules may apply. Network layer firewalls generally fall into two sub-categories. A stateful firewall is a firewall that keeps track of the state of network connections (such as TCP streams, UDP communication) traveling across it. The firewall is programmed to distinguish legitimate packets for different types of connections. Only packets matching a known connection state will be allowed by the firewall, while other packets will be rejected. Stateless firewalls have packetfiltering capabilities, but cannot make more complex decisions on what stage communications between hosts have reached.

Application-layer firewalls work on the application level of the TCP/IP stack (i.e., all browser traffic, or all telnet or ftp traffic), and may intercept all packets traveling to or from an application. In principle, application firewalls can prevent all unwanted outside traffic from reaching protected machines. These firewalls inspect packets for improper content. An XML firewall exemplifies a recent kind of application-layer firewall. An example of such a firewall is provided by EP 1 296 252.

The network layer firewalls are disadvantageous in that complicated rule sets must be set up and maintained. On the other hand, the application-layer firewalls are disadvantageous in that the screening of the content of the packets requires a considerable amount of resources and/or may take a significant amount of time.

There is a need in the art for an improved security system capable of e.g. saving resources.

SUMMARY

This Summary and Abstract are provided to introduce some concepts in a simplified form that are further described below in the Detailed Description. This Summary and Abstract are not intended to identify key features or essential features of the claimed subject matter, nor are they intended to be used as an aid in determining the scope of the claimed subject matter. In addition, the description herein provided and the claimed subject matter should not be interpreted as being directed to addressing any of the short-comings discussed in the Background.

A computer-implemented method of controlling a computer application program in a computer system configured for electronic communication with a client is proposed. The computer system is configured to have access to a first request set of one or more allowable requests corresponding to a first application state of the computer application program. The computer application program may run on the computer system or on one or more other computer systems. A client request is received at the computer system for the computer application program. The computer application program is in the first application state in relation to said client (using e.g. the client connection). The client request is analysed to determine if the client request matches one of the allowable requests corresponding to the first application state of the computer application program. The computer application program is controlled by instructing this program to execute the client request only if the client request matches an allowable request of the first request set.

A computer program for executing the method and a computer readable media (e.g. computer storage media) containing such a computer program are also proposed.

A computer system for controlling a computer application program is also proposed. The computer application program is installed on the computer system or on one or more other computer systems. The computer system is configured for connecting to at least one client. The computer system comprises a client request receiver configured for receiving a client request directed to said computer application program. The computer program may then be in a first application state. The computer system also comprises an analyzer module configured for analyzing if the client request matches an allowable request of a first request set. The first request set comprises one or more allowable requests corresponding to the first application state of the computer application program in relation to said client. The computer system also comprises an instruction module configured for instructing the computer application program to execute said client request only if the client request matches one of the allowable requests of the first request set.

The client request may e.g. comprise a command for the computer application program.

It should be appreciated that the first set of allowable requests may comprise a selection of a (large) plurality of requests valid for said computer application program.

The proposed method and system combine an increased security with a decreased application of resources. Generally, a computer application program is capable of handling a plurality of requests, frequently a (very) large amount of requests. The proposed method and system are capable of selecting only those requests that are allowable, given the application state of the computer program(s). Only requests matching the allowable requests for that state will be executed, providing for a secure system. On the other hand, the method and system do not examine the content itself but keep track of lower level requests (e.g. application level requests) that may be expected from a client in relation to the application state of the computer program(s) at a particular moment. Otherwise, the request is rejected or simply stalled, but not executed. This approach allows for speedy yet secure screening of traffic.

It should be appreciated that the method and computer system may be in communication with one or more other computer systems that in fact run the computer application program. The computer system then functions as a gatekeeper.

Examples of application programs include, but are not limited to, web servers, web services, application servers and in particular, databases.

The embodiments of claims 2 and 19 provide the advantage of dynamically building request sets corresponding to the applicable application state of the computer application program. The change of the communication state of the computer system or another computer system may be determined by the execution of a request by the application program as defined in claim 3.

There are various ways of informing the computer system of the applicable request set with allowable requests for a particular application state of the computer application program.

The embodiment of claim 20 has the advantage that the computer application program only reports its application state for a particular client (connection) to the computer system. The computer system may use the reported state to obtain, retrieve or update the applicable request set for this state of the computer application program.

The embodiments of claims 4 and 21, on the other hand, have the advantage that the applicable request set is directly received from the computer application program (or another program configured for reporting the application state of the computer program to the computer system).

Claims 5, 6 and 22 define embodiments of requests on a level below the level of the actual content. Screening on this level is fast but secure.

The embodiments of claims 7 and 23 enable keeping track of a plurality of clients connected to the computer system by means of their connections, e.g. like a stateful firewall. In particular, the computer system monitors e.g. which client is connected and/or which client requests have been made by which client (connection state). The application state of the computer application program may then be related to a particular connection state.

The embodiments of claims 8 and 24 allow to distinguish between malicious and non-malicious clients. Most organizations use computer systems, commonly referred to as proxies, that separate a local area network from a wide area network, such as the Internet. The proxies, amongst other functions, use network address translation (NAT). The amount of requests made to the proxy is considerable, but these requests are most probably non-malicious. By setting an appropriate threshold (based e.g. on the average number or requests that may be expected from a local area network using historic data of the number of login requests received from internal clients), malicious outside requests may be distinguished from non-malicious requests from the local area network. The frequency of requests from inside clients can be estimated on the basis of the number of login requests and the flow of the application program, i.e. the sequence of application states of the computer application program. A large number of requests from outside clients may indicate an attack. Such requests may be denied. Requests from these clients may be monitored, rejected, or analysed on the basis of a contact history, past behaviour and/or domain.

The embodiments of claims 9-12 and 25-28 allow for blocking or throttling back clients that e.g. send a high number of requests or a high number of the same client requests. More general, malicious clients may be distinguished from non-malicious clients, the latter being serviced before the former even if these requests arrive later at the computer system. Although these embodiments add to the security in general, it should be appreciated that these embodiments may also be applied separate from the invention as defined in claims 1-8.

Although the client and the computer system may be implemented on a single device, the embodiments of claims 13 and 29 may be preferred.

The amount of possible requests is especially large for database computer application programs. The embodiments of claims 14, 15, 30 and 31 are particularly advantageous in these cases.

Hereinafter, exemplary embodiments of the invention will be described in further detail. It should be appreciated, however, that these embodiments may not be construed as limiting the scope of protection for the present invention.

DETAILED DESCRIPTION OF THE ILLUSTRATIVE EMBODIMENTS

Figure 1A:
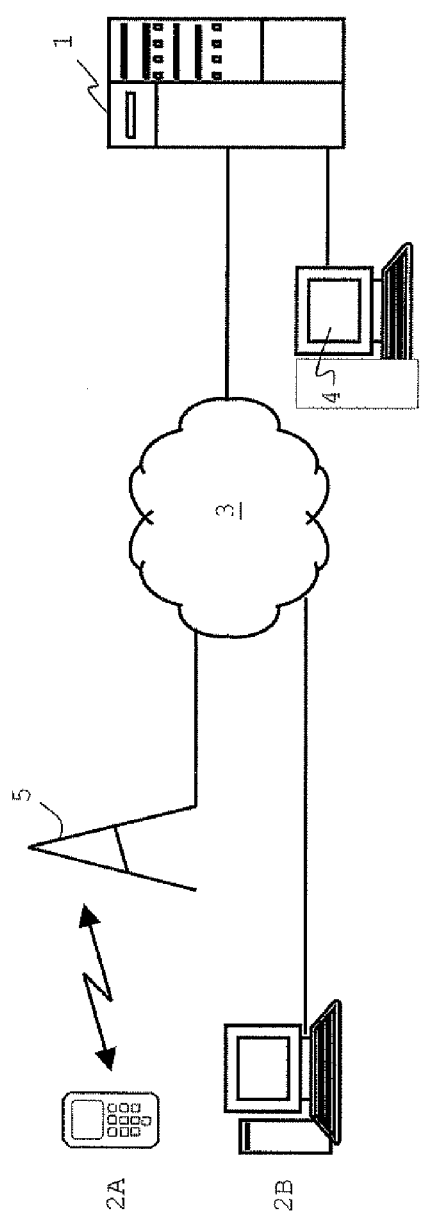
FIGS. 1A and 1B provide schematic illustrations of various situations of use of the computer system.
Figure 1B:
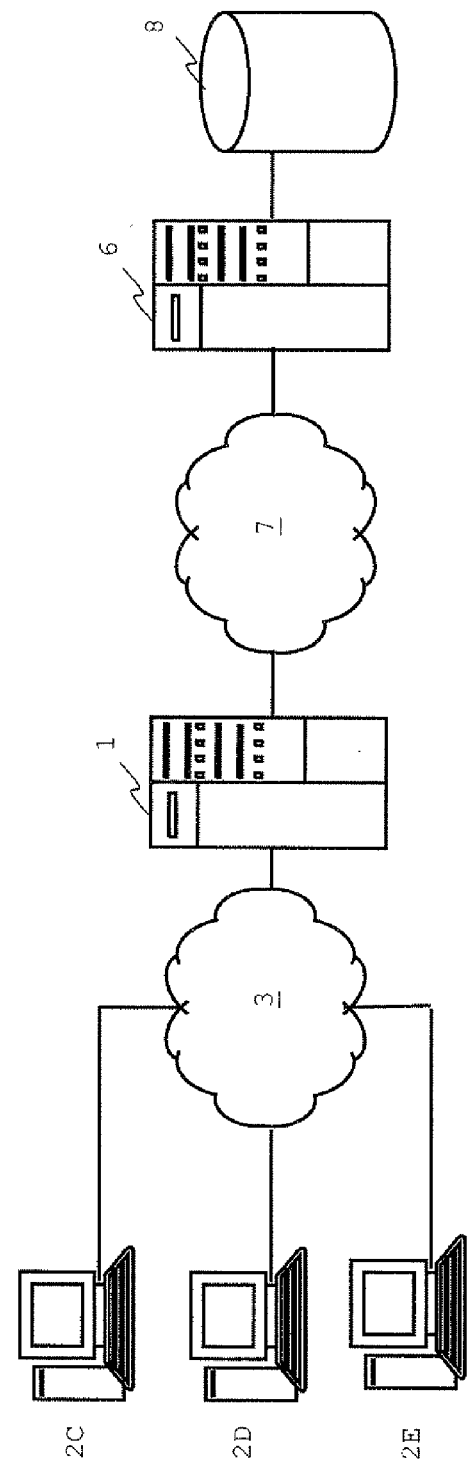

FIGS. 1A and 1B provide schematic illustrations of various situations of use of a computer system 1. In FIG. 1A, client devices 2A, 2B are connected via a network 3 to the computer system 1. The computer system 1, however, may also run a client itself and provide a user interface for the client on display 4. The computer system 1 also runs a computer application program, such as a web server or a database application, to which requests (commands) of the clients are directed. Client devices can take many forms including mobile wireless devices 2A, such as telephones, PDA's, laptop computers etc. communicating with the network 3 through a wireless access network 5 and wired devices, such as desktop computers 2B.

In FIG. 1B, client devices 2C, 2D and 2E are connected to the computer system 1 via a first network 3. The computer system 1 functions as a gatekeeper for a host system or server 6 running a particular computer application program to which requests from the clients are directed. A plurality of such servers 6 may be provided. The computer system 1 is communicatively connected to the host system 6 via a second network 7. The host system 6 has access to a database 8 and may in particular run a database application using database 8.

Various other situations may be contemplated by the person skilled in the art for the application of the computer system 1 without departing from the scope of the present invention.

The client application program may be installed and run on the computer system 1, the host system 6 or one or more other computer systems. The computer application program has a plurality of application states. Application states may represent logical steps in a particular (predetermined) sequence of states for the application program. Application states of the computer application program may change following execution of a request to that program. A large amount of requests is valid for these application states. However, for each of the application states, only a particular subset of the large amount of requests is allowable.

As an example, the activation of a link on a website page may return another web page with a new set of links (change of the application state). Of the many possible requests to the web server, only the activation of the links on the returned web page belongs to the set of allowable requests for this application state.

Figure 2B:
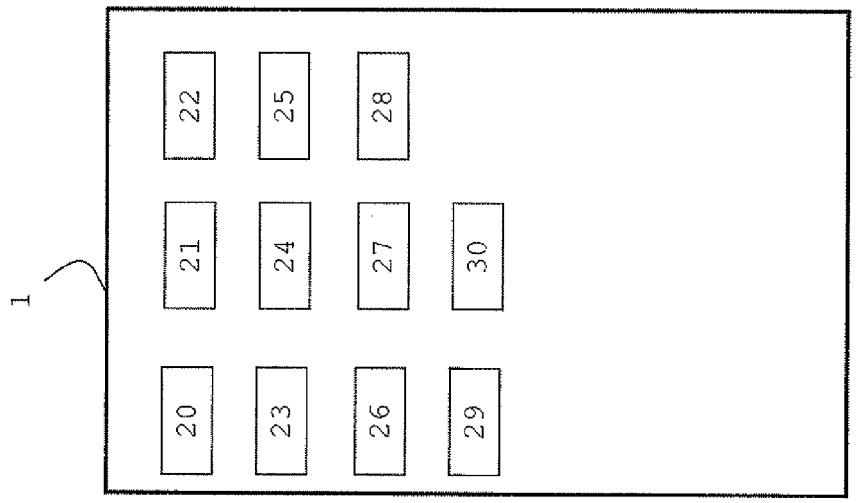
FIGS. 2A and 2B provide schematic illustrations of the system.
Figure 2A:
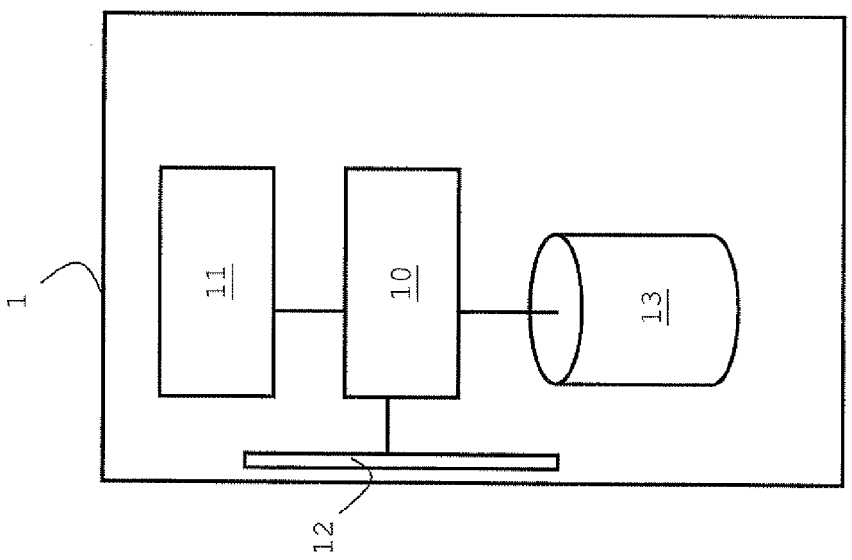

In FIG. 2A, the computer system 1 of FIGS. 1A and 1B is schematically illustrated. The computer system 1 comprises a processor 10, a memory 11, a network adapter 12 for communication with one or more of the devices 2A-2E via the networks 3 (and possibly with the host system 6 via the second network 7). It should be appreciated that normally, the computer system a of FIGS. 1A and 1B would be configured for connecting to more than two or three client devices.

The computer system 1 may also contain a database 13 with request sets for various application states of the application program run by the computer system 1 or the host system 6. The database 13 may also be used by a database application program executable on the computer system 1.

The specific functions of the computer system 1 are schematically illustrated in FIG. 2B and will now be described in further detail. It should be appreciated that the functions may be largely implemented as software code portions of one or more computer programs executed on the processor 10.

The computer system 1 comprises a connection module 20 for establishing a connection with the client devices 2A-2E. The connection module monitors the connection with the client devices. The connection module 20 may be configured to determine a communication state for the client to the computer system 1.

The computer system 1 comprises a client request receiver 21 configured for receiving (and possibly processing) a request from client devices 2A-2E or an internal client. The client request is a request or command for the computer application program installed on the computer system 1 and/or the host system 6. The client request may e.g. be a http-request resulting from activation of a link on a particular web page or a command for a database 8, 13.

The computer system 1 may also have an analyzer module 22 configured for analyzing if the client request received by the client request receiver 21 matches an allowable request of a request set comprising one or more allowable requests corresponding to an application state of the computer application program in relation to that client.

The computer system 1 also comprises an instruction module 23 for instructing the computer application program of the computer system 1 and/or the host system 6 to execute the client request only if the client request matches one of the allowable requests of said the request set.

Of course, the client request receiver 21 may receive further client requests. The analyzer module 22 may analyze whether the further client requests match allowable requests of further corresponding requests sets, each of the request sets corresponding to different application states of the computer application program. The instruction module 23 may then instruct the computer application program to execute the further requests only if these requests match allowable requests of the applicable request set of the corresponding application state.

There are various ways of informing the computer system 1 of the applicable request set with allowable requests for a particular application state of the computer application program.

The computer system 1 may e.g. comprise an application state detector 24 configured for detecting the application states of the computer application program of the computer system 1 and/or the host system 6. If the detector 24 detects an application state of the program, a request set retriever 25 is provided for retrieving, obtaining and/or updating the request set for that particular application state. The request set may e.g. be retrieved from the database 13.

However, the applicable request set of allowable requests for a particular application state of the computer application program may also be received by a request set receiver 26 of the computer system 1. The request set may e.g. be received from the computer application program running on the computer system 1 or the server 6, or from another computer program.

The computer system 1 may also store a threshold amount of client requests. The computer system 1 is configured for maintaining a threshold amount of client requests per time unit. The instruction module 23 is configured for instructing the computer application program to execute the client request only if the amount of client requests is below said threshold amount. Such functionality may e.g. prove advantageous when the computer system 1 is implemented in a proxy server or when many clients share a common public IP address.

In an alternative embodiment, the computer system 1 may also have a distinguishing module 27 configured for distinguishing between malicious and non-malicious clients. Malicious and non-malicious clients may be distinguished e.g. on the basis the number of client requests received from clients, the contact history of clients with the computer system 1, the type of content of requests and/or the content of requests received from said clients. A ranking module 28 is provided that is configured for ranking client requests from the malicious and said non-malicious clients to obtain a queue of non-malicious client requests followed by the malicious client requests. The instruction module 23 is configured for instructing said computer application program to first execute said non-malicious client requests. The malicious client requests may be analysed by another analyzer module 29 after the legitimate requests have been handled, thereby penalizing the malicious client. The results may e.g. be used for updating a contact history between the computer system 1 and the malicious clients.

The computer system 1 may have a storage module 30 for storing a contact history from clients. The ranking module 28 may be configured for ranking clients known from said contact history higher in the queue than clients not known from said contact history.

Figure 3A:
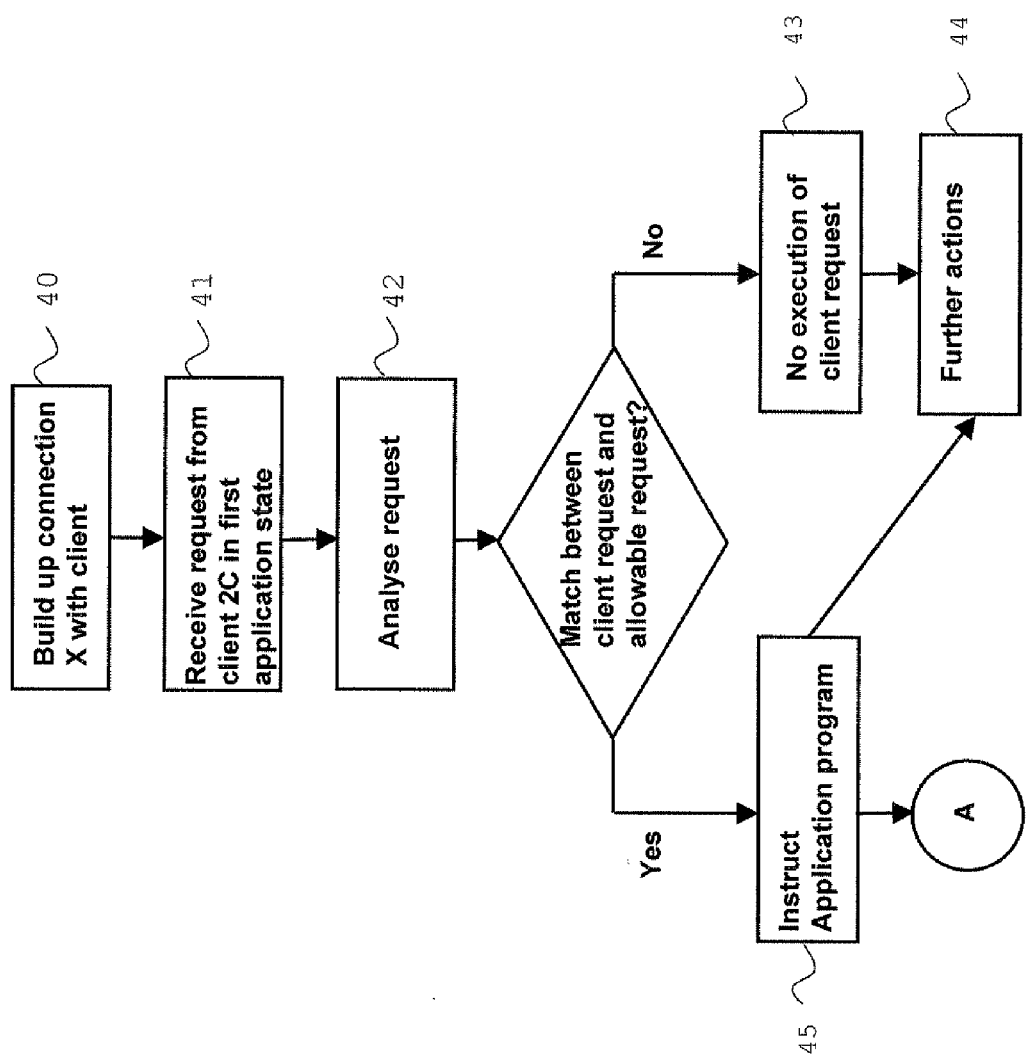
FIGS. 3A and 3B illustrate steps of a method of operation of the system.
Figure 3B:
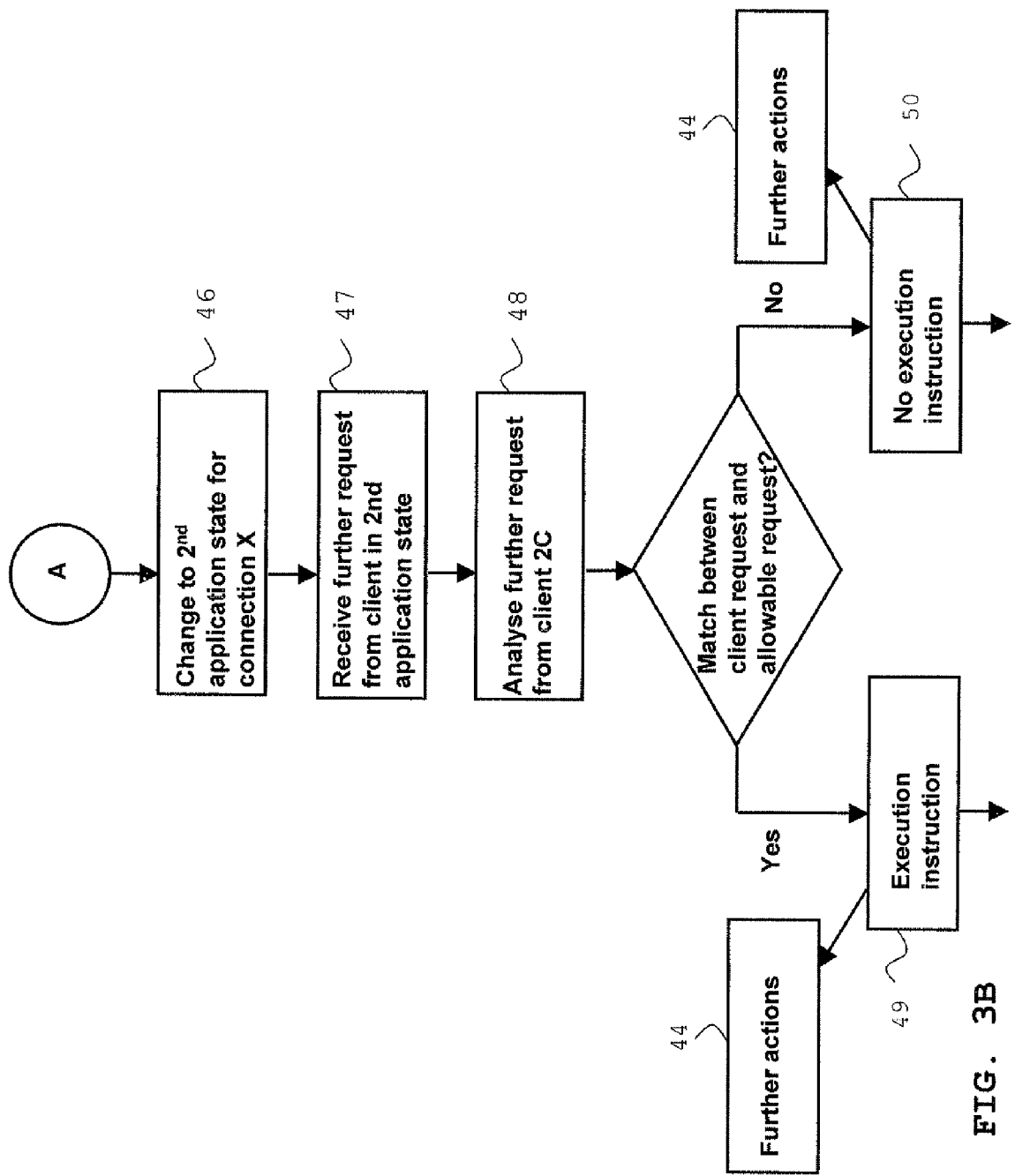

Next, the operation of the computer system I will be described with reference to FIGS. 3A and 3B. It will be assumed that the computer system 1 functions as a gate keeper for a host system 6 running a database application program for retrieving data from the database 8, in conformance with FIG. 1B.

A client installed on client device 2C requests use of a computer application program running on host system 6 via communication network 3.

In step 40, computer system 1 intercepts the request and establishes a connection using connection module 20. Connection module 20 monitors the connection and the requests from client device 2C. A starting page, e.g. a html page, is presented to the client device 2C. It is assumed here that the computer system 1 does not screen the initial request, although an initial application state with assigned allowable requests for starting the computer application may apply.

The starting page of the computer application program presented to the client device 2C allows a number of requests to be made, e.g. http GET requests. These requests constitute a first request set of allowable requests corresponding to the starting page (the application state) of the computer application program. For simplicity reasons it will be assumed that the only valid requests here are constituted by a set of hyperlinks that can be activated. It should be appreciated, however, that other requests or commands may be possible, e.g. http-post requests.

In step 41, a http-request is received from the client device 2C resulting from activation of a hyperlink from the starting page. The connection module 20 monitors that this request comes from client device 2C that issued a request from the starting page.

The request set receiver 26 receives the first request set from the computer application program, running on the host system 6, valid for the starting page. In step 42, the analyzer module 22 of computer system 1 examines whether the http-request received from client device 2C matches an allowable request of the received first request set for the html starting page.

If the http-request is not matched by a request of the first request set, the instruction module 23 would not instruct the computer application program running on host system 6 to execute the http-request (step 43). It should be noted that it is possible that a request that seems valid from the client device perspective will not be executed when this request is not part of the applicable request set.

In step 44, further actions are performed on the not executed request. These actions include, but are not limited to, discarding the request, analyzing the request, storing the requests, extract information from the request for building a request history etc.

If the analyzer module 22 finds that the http-request from client device 2C matches an allowable request of the first request set of the starting html page, the instruction module 23 instructs the computer application program to execute the http-request on the database 8 in step 45. It is noted that further actions may also be performed on these executed requests.

Execution of the request makes the application program extract data from the database to build a new html page in dependence on the request. The new html page is transmitted to the client device 2C.

The new html page corresponds to a new application state of the computer application program (step 46). The connection module 20 that maintains the open connection with client device 2C registers that the new html page has been transmitted to the client device 2C.

In step 47, a further http-request is received from client device 2C.

Before or after having received the http-request, the computer application program has informed the analyzer module 22 of the request set corresponding to the new application state. Upon receipt of the further http-request, the analyzer module 22 examines in step 48 whether the further http-request matches an allowable request of the request set valid for the new application state.

Finally, dependent on the outcome of the analysis by the analyzer module 22, the instruction module 23 will either instruct the computer application program to execute the request (step 49) or not (step 50).

It should be appreciated that the flow chart continues for further requests of the client device 2C.

It should also be appreciated that the computer system 1 keeps track of the application state for each client, e.g. using the connection module 20 having tables for each connection, such that the computer system 1 is configured for handling requests from multiple clients, whereas the application state of the computer application program(s) may be different for each of the clients at a particular instance of time.

It should also be appreciated that each request received from a client may be analysed in accordance with step 44, e.g. for statistical reasons.

Although the subject matter has been described in language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims.

The invention claimed is:

1. A computer-implemented method of controlling a computer application program in a computer system configured for electronic communication with a client and having access to a first request set of one or more allowable requests and a second request set of one or more allowable requests, said computer application program running on said computer system or another computer system in relation to said client, the method comprising:
receiving, at said computer system, a client request from said client for said computer application program in a first application state, wherein the first application state comprises a first page of the computer application program;
analyzing with said computer system whether said client request matches an allowable request of said first request set in response to receiving said client request, wherein the first request set corresponds to said first application state of said computer application program;
instructing said computer application program to execute said client request only when said client request matches one of said allowable requests of said first request set;
changing said first application state to a second application state of said computer application program in response to executing said client request when said client request matches said one of said allowable requests of said first request set, said second application state being different from said first application state, and wherein the second application state comprises a second page of the computer application program;
receiving a further client request from said client device;
analyzing whether said further client request matches an allowable request of said second request set, wherein the second request set corresponds to said second application state of said computer application program; and
instructing said computer application program to execute said further client request only when said further client request matches one of said allowable requests of said second request set.

2. The method according to claim 1, wherein at least one of said first request set or said first application state is obtained from said computer application program running on said computer system or said other computer system.

3. The method according to claim 1, wherein said allowable requests of said first request set relate to application layer requests.

4. The method according to claim 3, wherein said application layer requests comprise at least one of hypertext transfer protocol (HTTP) requests, file transfer protocol (FTP) requests, simple mail transfer protocol (SMTP) requests and telnet requests.

5. The method according to claim 1, further comprising:
determining, by said computer system, a connection state between said client and said computer system;
relating said first application state and a second application state to said connection state.

6. The method according to claim 1, wherein said computer system maintains a threshold amount of client requests per time unit, the method comprising instructing said computer application program to execute said client requests only if the amount of client requests is below said threshold amount.

7. The method according to claim 1, further comprising:
distinguishing between malicious and non-malicious clients;
ranking client requests from said malicious and said non-malicious clients to obtain a queue of non-malicious client requests followed by said malicious client requests;
instructing said computer application program to first execute said non-malicious client requests.

8. The method according to claim 7, further comprising analyzing said malicious client requests from said queue after having instructed said computer application program to execute all non-malicious client requests.

9. The method according to claim 7, wherein said computer system stores a contact history from clients, further comprising ranking clients known from said contact history higher in said queue than clients not known from said contact history.

10. The method according to claim 7, further comprising distinguishing said malicious and non-malicious clients on the basis of at least one of the following: number of client requests received from clients, contact history of clients with said computer system, type of content of requests, content of requests received from said clients.

11. The method according to claim 1, wherein said client is implemented in a client device and said computer system is connected to at least one communication network to electronically communicate with said client device, the method comprising receiving said client request over said communication network.

12. The method according to claim 1, wherein said computer system or said other computer system comprises a database and said computer application program is a database application program.

13. The method according to claim 12, further comprising:
receiving said first set of allowable database requests from said database application program;
instructing a database operation of said database application program of said database only if said client request matches one of said allowable database requests.

14. A non-transitory computer readable storage media containing a computer program comprising software code portions adapted for, when installed on and executed by an electronic system, performing a method of controlling a computer application program in a computer system configured for electronic communication with a client and having access to a first request set of one or more allowable requests and a second request set of one or more allowable requests, said computer application program running on said computer system or another computer system in relation to said client, the method comprising:
receiving, at said computer system, a client request from said client for said computer application program in a first application state, wherein the first application state comprises a first page of the computer application program;
analyzing whether said client request matches an allowable request of said first request set in response to receiving said client request, wherein the first request set corresponds to said first application state of said computer application program;
instructing said computer application program to execute said client request only when said client request matches one of said allowable requests of said first request set;
changing said first application state to a second application state of said computer application program in response to executing said client request when said client request matches said one of said allowable requests of said first request set, said second application state being different from said first application state, and wherein the second application state comprises a second page of the computer application program;
receiving a further client request from said client device;
analyzing whether said further client request matches an allowable request of said second request set, wherein the second request set corresponds to said second application state of said computer application program; and
instructing said computer application program to execute said further client request only when said further client request matches one of said allowable requests of said second request set.

15. A computer system for controlling a computer application program on said computer system or another computer system, said computer system being configured for connecting to at least one client and comprising:
a processing unit having a processor and memory operably coupled to the processor, the processing unit comprising:
a client request receiver configured for receiving a client request and a further client request directed to said computer application program, said computer application program comprising at least a first application state and a second application state, wherein the first and second application state are different application states obtainable by executing said client request and said further client request, respectively;
an analyzer module configured for analyzing whether said client request matches an allowable request of a first request set comprising one or more allowable requests corresponding to said first application state of said computer application program in relation to said client and whether said further client request matches an allowable request of said second request set of one or more allowable requests corresponding to said second application state of said computer program in relation to said client; and
an instruction module configured for instructing said computer application program to execute said client request only when said client request matches one of said allowable requests of said first request set to obtain said second application state and for instructing said computer application program to execute said further client request only when said further client request matches one of said allowable requests of said second request set, wherein the first application state comprises a first page of the computer application program and the second application state comprises a second page of the computer application program.

16. The computer system according to claim 15, wherein said processing unit further comprises:
an application state detector configured for detecting said first application state and said second application state;
a request set retriever configured for retrieving said first request set and said second request, respectively, in response to detecting said first application state or said second application state.

17. The computer system according to claim 15, wherein said processing unit further comprises a request set receiver configured for receiving said first request set and said second request set.

18. The computer system according to claim 15, wherein said client request receiver is configured for receiving application layer requests, such as hypertext transfer protocol (HTTP) requests, file transfer protocol (FTP) requests, simple mail transfer protocol (SMTP) requests and telnet requests.

19. The computer system according to claim 15, wherein said processing unit further comprises a connection state monitor configured for determining a connection state between said client and said computer system, said computer system being configured such that said first application state and a second application state of said computer application program are related to said connection state.

20. The computer system according to claim 15, wherein said computer system is configured for maintaining a threshold amount of client requests per time unit and wherein said instruction module is configured for instructing said computer application program to execute said client request only if the amount of client requests is below said threshold amount.

21. The computer system according to claim 15, wherein said processing unit further comprises:
a distinguishing module configured for distinguishing between malicious and non-malicious clients;
a ranking module configured for ranking client requests from said malicious and said non-malicious clients to obtain a queue of non-malicious client requests followed by said malicious client requests;
wherein said instruction module is configured for instructing said computer application program to first execute said non-malicious client requests.

22. The computer system according to claim 21, wherein said processing unit further comprises a second analyzer module configured for analyzing said malicious client requests from said queue after said installation module having instructed all non-malicious client requests.

23. The computer system according to claim 21, wherein said processing unit further comprises a storage module for storing a contact history from clients and a ranking module configured for ranking clients known from said contact history higher in said queue than clients not known from said contact history.

24. The computer system according to claim 21, wherein said distinguishing module is configured for distinguishing said malicious and non-malicious clients on the basis of at least one of the following: number of client requests received from clients, contact history of clients with said computer system, type of content of requests, content of requests received from said clients.

25. The computer system according to claim 15, wherein said computer system is configured for receiving said client requests over communication network.

26. The computer system according to claim 15, wherein said computer application program is a database application program installed on said other computer system.

27. The computer system according to claim 26, wherein said processing unit comprises:
a receiver configured for receiving said first set of allowable database requests from said database application program of said other computer system; and
said instruction module is configured for instructing said database application program to execute a database operation only if said client request matches one of said allowable database requests.

28. The non-transitory computer readable storage media of claim 14, wherein at least one of said first request set or said first application state is obtained from said computer application program running on said computer system or said other computer system.

29. The non-transitory computer readable storage media of claim 14, the method further comprising:
distinguishing between malicious and non-malicious clients;
ranking client requests from said malicious and said non-malicious clients to obtain a queue of non-malicious client requests followed by said malicious client requests;
instructing said computer application program to first execute said non-malicious client requests.

30. The non-transitory computer readable storage media of claim 14, wherein said computer system maintains a threshold amount of client requests per time unit, the method comprising instructing said computer application program to execute said client requests only if the amount of client requests is below said threshold amount.

31. The non-transitory computer readable storage media of claim 14, wherein said client is implemented in a client device and said computer system is connected to at least one communication network to electronically communicate with said client device, the method comprising receiving said client request over said communication network.

* * * * *